(12) United States Patent
Robison

(10) Patent No.: US 6,472,597 B1
(45) Date of Patent: Oct. 29, 2002

(54) FUSE PANEL SPACER

(76) Inventor: Fred Robison, 501 S. Orange Ave., Dunn, NC (US) 28334

( * ) Notice: Subject to any disclaimer, the term of this patent is extended or adjusted under 35 U.S.C. 154(b) by 0 days.

(21) Appl. No.: 09/721,288

(22) Filed: Nov. 22, 2000

(51) Int. Cl.⁷ .................................................. H02G 3/08
(52) U.S. Cl. ...................... 174/50; 174/135; 174/138 G; 220/3.2
(58) Field of Search ................... 174/50, 53, 58, 174/60, 61, 135, 65 R, 65 G, 138 G; 220/3.2, 3.3, 3.94, 241, 3.5, 3.6, 3.7, 3.8

(56) References Cited

U.S. PATENT DOCUMENTS

| | | | |
|---|---|---|---|
| 3,563,131 A | * 2/1971 | Ridley, Sr. ................... 411/384 |
| 3,586,292 A | * 6/1971 | Buck .......................... 174/146 |
| 3,952,906 A | * 4/1976 | Georgopulos ............... 220/3.3 |
| 3,968,323 A | * 7/1976 | Blanchet ..................... 174/135 |
| 4,407,042 A | 10/1983 | Schramme et al. ............ 16/2 |
| 4,419,537 A | * 12/1983 | Leep et al. ................ 174/65 R |
| 4,576,664 A | * 3/1986 | Delahunty ................. 248/27.8 |
| 4,922,056 A | * 5/1990 | Larsson ..................... 174/65 R |
| 4,998,343 A | * 3/1991 | Costello .................... 174/72 A |
| 5,189,256 A | * 2/1993 | Epple ........................... 174/50 |
| 5,239,129 A | * 8/1993 | Ehrenfels ...................... 174/51 |
| 5,266,051 A | 11/1993 | Chupak ....................... 439/559 |
| 5,302,138 A | 4/1994 | Shields ........................ 439/527 |
| D347,991 S | * 6/1994 | Barritt ......................... D8/395 |
| 5,728,974 A | 3/1998 | Kitoh et al. .............. 174/65.55 |
| 5,816,850 A | 10/1998 | Yamada et al. ............. 439/507 |
| 5,929,381 A | * 7/1999 | Daoud ......................... 174/135 |
| 5,933,563 A | * 8/1999 | Schaffer et al. ............... 174/58 |
| 5,954,302 A | * 9/1999 | Robertson et al. ............ 248/73 |
| 6,025,557 A | 2/2000 | Daoud .......................... 175/65 |
| 6,069,317 A | 5/2000 | Wagganer ..................... 174/65 |
| 6,233,160 B1 | * 5/2001 | Schockley ................... 361/833 |

* cited by examiner

Primary Examiner—Dean A. Reichard
Assistant Examiner—Angel R. Estrada
(74) Attorney, Agent, or Firm—Coats & Bennett, P.L.L.C.

(57) ABSTRACT

A spacer for protecting wires inside a fuse box comprises in one embodiment, a clip to secure the spacer to an inwardly curling lip on the fuse box. Fasteners attach a faceplate to the fuse box and are received by the spacer to preclude the terminal end of the fastener from abrading the wires within the fuse box. Further, the spacer receives the wires contiguous a spacing surface, keeping the wires in a desired position.

21 Claims, 9 Drawing Sheets

FUSE PANEL SPACER

BACKGROUND OF THE INVENTION

The present invention relates to a spacer for use in a fuse box to space wires from fasteners used to secure a faceplate to the fuse box.

Virtually every house or building that has electricity has a fuse panel contained within a fuse box. The fuse box surrounds the fuse panel and protects it from the environment, as well as preventing persons from inadvertently contacting the fuse panel. The fuse panel may typically include a plurality of circuit breakers that may be toggled as needed to turn on and off electrical circuits. In a typical building, ten, twelve, and fourteen gauge wire (AWG) may be used to connect the fuse panel to the branch circuits, such as outlets, overhead lights and fans, switches, water heaters, furnaces, and air conditioning units. These branch circuit wires carry the electricity from the fuse panel to the branch circuit load. A one hundred Amp fuse panel can have as many as twenty-four circuit breakers, or branch circuits. A two hundred Amp fuse panel may have as many as forty-two circuit breakers. Each 120 V branch circuit, controlled by these circuit breakers, usually requires three wires: the ungrounded conductor (hot), the grounded conductor (neutral), and the grounding conductor (ground). Therefore, a forty-two circuit, two hundred Amp panel could have as many as 126 branch circuit wires.

Electricity is supplied to the fuse panel from an external transformer or power line using much heavier wire. By national code, one hundred Amps require number one aluminum or number three copper (AWG) wire. By the code, two hundred Amps require 4/0 aluminum or 3/0 copper (AWG) wire. Even larger wires are used in larger homes and commercial buildings. As a general rule, the heavier the wire, the more electricity flowing through it.

These heavier wires, because of their larger diameters, are remarkably inflexible. In many installations, the heavy main feeder wires are brought in the bottom and loop around inside of the fuse box to connect to the fuse panel. An electrician installing the fuse box attempts to bend the wires into a desired position against the back of the box. However, many times these wires will bow out of position and contact the internal lip that extends along the front edge of the fuse box.

On most fuse panels, the front cover of the box is screwed on. These screws usually have a sharp tip that extends through a hole in the front cover and a matching hole in the front internal lip of the fuse box. On larger commercial and/or industrial panels, the fuse boxes have clamps that hold the front cover onto the body of the panel. Either the screw or the clamp can (and frequently do) pierce the insulation on the out of position main feeder wires or branch circuit wires. Because the fasteners are metal, it is possible that the fastener shorts the wire to the fuse box, such that a person touching the fuse box may receive a shock, or in extreme situations, be electrocuted. This problem is compounded by the fact that, until the faceplate is removed, visual inspection will not reveal this hazard.

SUMMARY OF THE INVENTION

The present invention comprises placing a spacer within the fuse box to space the internal wires from fasteners that pierce the fuse box. The spacer may be secured to the interior lip of the fuse box and positioned to separate the wires from the terminal ends of the fasteners. A lower surface of the spacer may be shaped to urge the wires away from the faceplate of the fuse box. The spacer may be made of a non-conductive material such as rubber or a polymeric material.

In a first embodiment, the spacer is secured to an inwardly curling lip on the fuse box by an attaching device such as a clip. A fastener, such as a screw, may be inserted through the faceplate, extend through the clip, through the inwardly curling lip, and into the spacer. This effectively precludes the wires from contacting the sharp tip of the fastener. In a variant of this embodiment, not every fastener has a spacer, but sufficient spacers are used to protect the wires from any exposed fasteners.

In a second embodiment, the spacer is secured to the sidewall below the upper lip of the fuse box. Again, a fastener extends through the sidewall to maintain the spacer in the desired position. Wires are inserted under the spacer such that they are precluded from coming into contact with the sharp tips of the fastener.

BRIEF DESCRIPTION OF THE DRAWINGS

FIG. 3 illustrates a cross-sectional view of the fuse box of FIG. 2 along lines 3—3 with the faceplate shown dotted in;

DETAILED DESCRIPTION OF THE INVENTION

Figure 9:
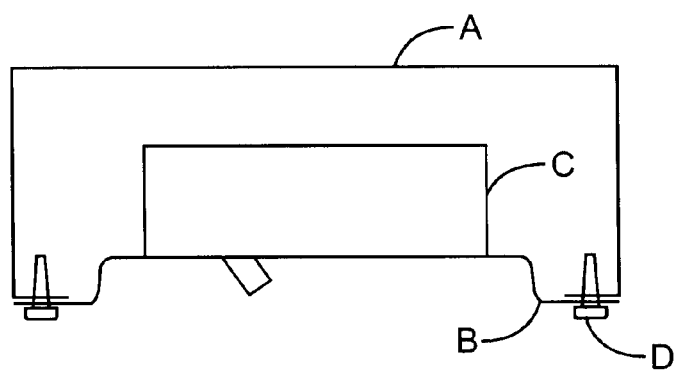
FIG. 9 illustrates a cross sectional view of a first typical fuse box.
Figure 10:
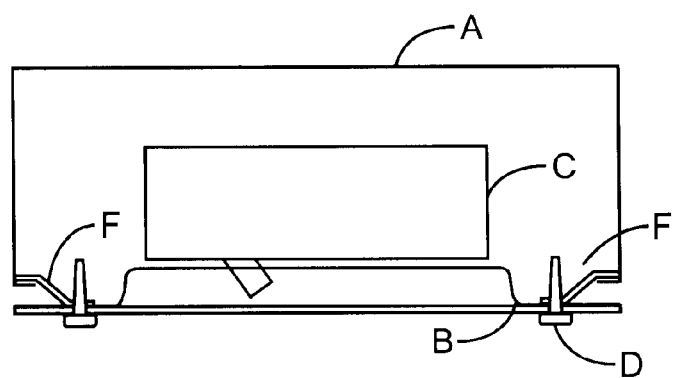
FIG. 10 illustrates a cross sectional view of a prior art industrial fuse box.

As noted above, typical fuse boxes may have elements which pierce or abrade the insulation on the wires. Examples are illustrated in FIGS. 9 and 10. These prior art fuse boxes include housings A, faceplates B and circuit breakers C. In FIG. 9, screws D may pierce the insulation. In FIG. 10, clamps F may do the same thing. There are other fuse boxes also in existence that do not conform identically to these illustrated, but their principle mode of operation remains similar.

Figure 1:
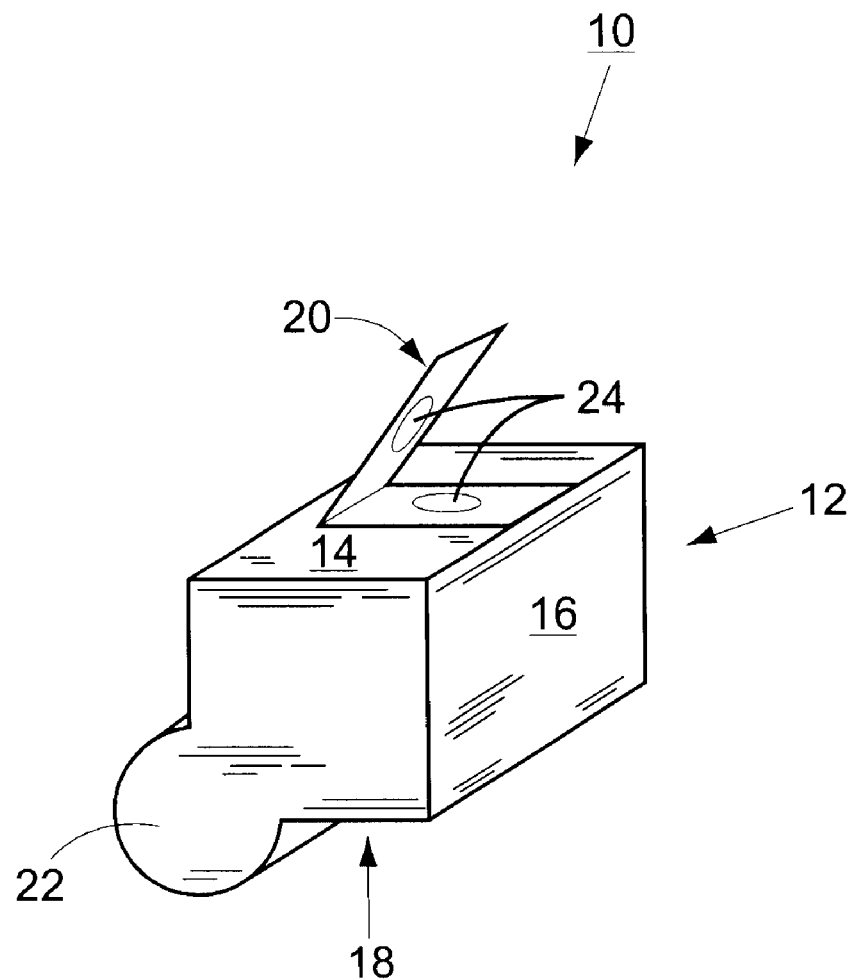
FIG. 1 illustrates a perspective view of a first embodiment of the spacer of the present invention.

Turning now to the drawings, one embodiment of a spacer 10 is illustrated in FIG. 1. Spacer 10 may comprise a body 12 and an attaching device 20. Body 12 may have a top surface 14, a side surface 16, and a spacing surface 18. Either top surface 14 or side surface 16 may comprise a fastening surface. Spacing surface 18 may be generally rounded and have a flange 22. Spacing surface 18 will come into contact with wires within the fuse box as illustrated in FIG. 3 and explained below. While it is possible that the spacer 10 may be made from any number of materials, in one embodiment, the body 12 will be made from a non-conductive material such as rubber or a non-conducting polymer. Alternately, a non-conductive sheath may cover some or all of the spacer 10, with a conductive material within the sheath (not shown). Attaching device 20 is an optional feature and may, as illustrated, be a metal clip with an aperture 24 for a fastener 70 (FIG. 2) to pass therethrough. Other materials are also possible for the attaching device 20.

Figure 2:
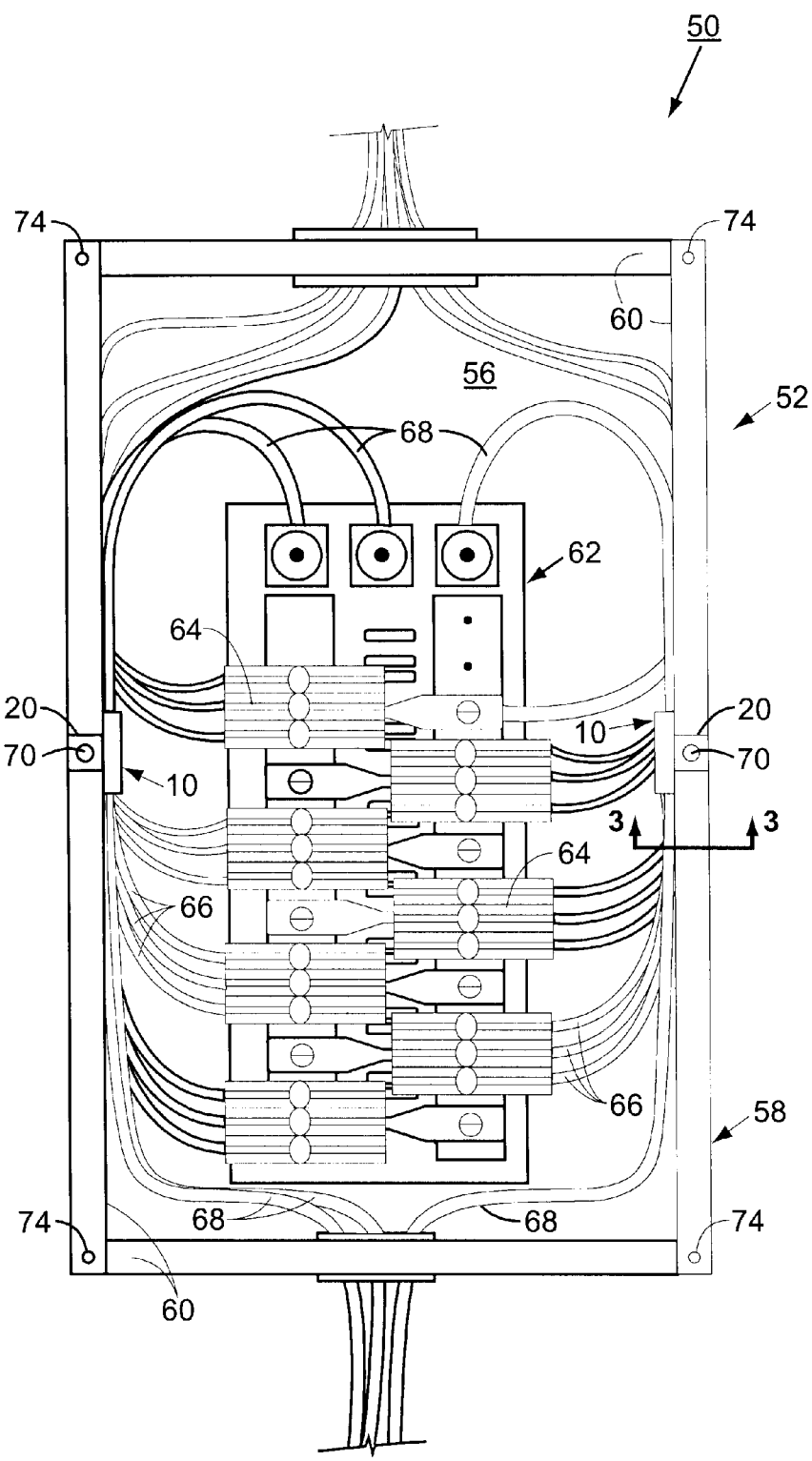
FIG. 2 illustrates a front elevational view of a fuse box with a plurality of spacers used therein and the faceplate removed.
Figure 3:
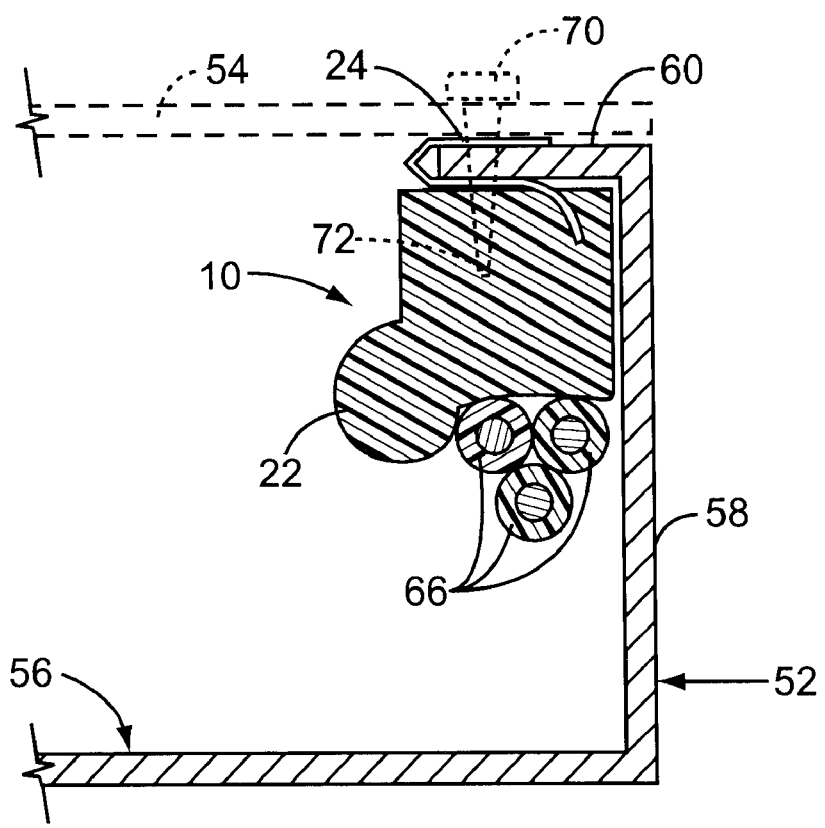

Spacer 10 is illustrated in use in a fuse box 50 in FIGS. 2 and 3. Fuse box 50 comprises a cabinet 52 and a faceplate 54 (FIG. 3). Cabinet 52 comprises a back panel 56, sidewalls 58, and a forwardly positioned inwardly curling lip 60. Fuse panel 62 is secured to the back panel 56 through conventional means. Fuse panel 62 comprises circuit breakers 64 as is conventional from which wires 66 extend. Further wires 68 carry electricity from a remote location to the fuse panel 62.

Inwardly curling lip 60 may include a plurality of apertures 74 through which fasteners attach faceplate 54 to the cabinet 52. As explained earlier, the wires 66 and 68 tend to be moderately inflexible, therefore they have a tendency to push out against sidewalls 58 and against the interior surface of inwardly curling lip 60. The present invention helps position the wires 66 or 68 in a location such that the likelihood of abrasion or piercing of the insulation on the wires is minimized.

As better seen in FIG. 3, the spacer 10 may receive a terminal end 72 of a fastener 70 therewithin while isolating wires 66 or 68 from the terminal end 72. In this embodiment, flange 22 maintains the wires 66 or 68 relatively close to the sidewall 58. Note that other shapes of spacing surface 18 are also possible. In particular, FIGS. 6A–6E illustrate alternate shapes for the spacer 10. Thus, while shown in FIG. 1 as a gently curved surface, spacing surface 18 may be rectilinear (FIGS. 6A, 6D, and 6E), arcuately curved in the opposite direction such that the flange 22 would be positioned contiguous to the sidewall 58 (FIG. 6B), a complete bow with two flanges (FIG. 6C) or other arrangement as needed or desired. Certain embodiments may urge the wires 66, 68 towards the sidewalls 58, while others merely space the wires 66, 68 from the fasteners 70. Depending on the desire of the installer, any shape for spacing surface 18 may be used, and all fall within the scope of the invention.

Likewise, while it is contemplated that fasteners 70 will not only secure the faceplate 54 to the cabinet 52, it is possible that a fastener such as a screw simply attach the spacer 10 to some portion of the cabinet 52 without also securing the faceplate 54. Further note that while wires 66 are illustrated as being spaced from the fastener 70 (FIG. 3), it is also possible that the spacer 10 will be used to space wires 68 from the fasteners.

As a non-shown variant spacers 10 may be positioned on either side of the fasteners 70 that secure the faceplate 54 to the cabinet 52. These alternately positioned spacers 10 maybe secured with an adhesive or other fastener as needed or desired. In this manner, the terminal tip 72 of the fastener 70 may not be occluded by the spacer 10, but rather the wires 66, 68 are precluded from reaching the terminal tip 72 by the adjoining spacers 10.

Figure 4:
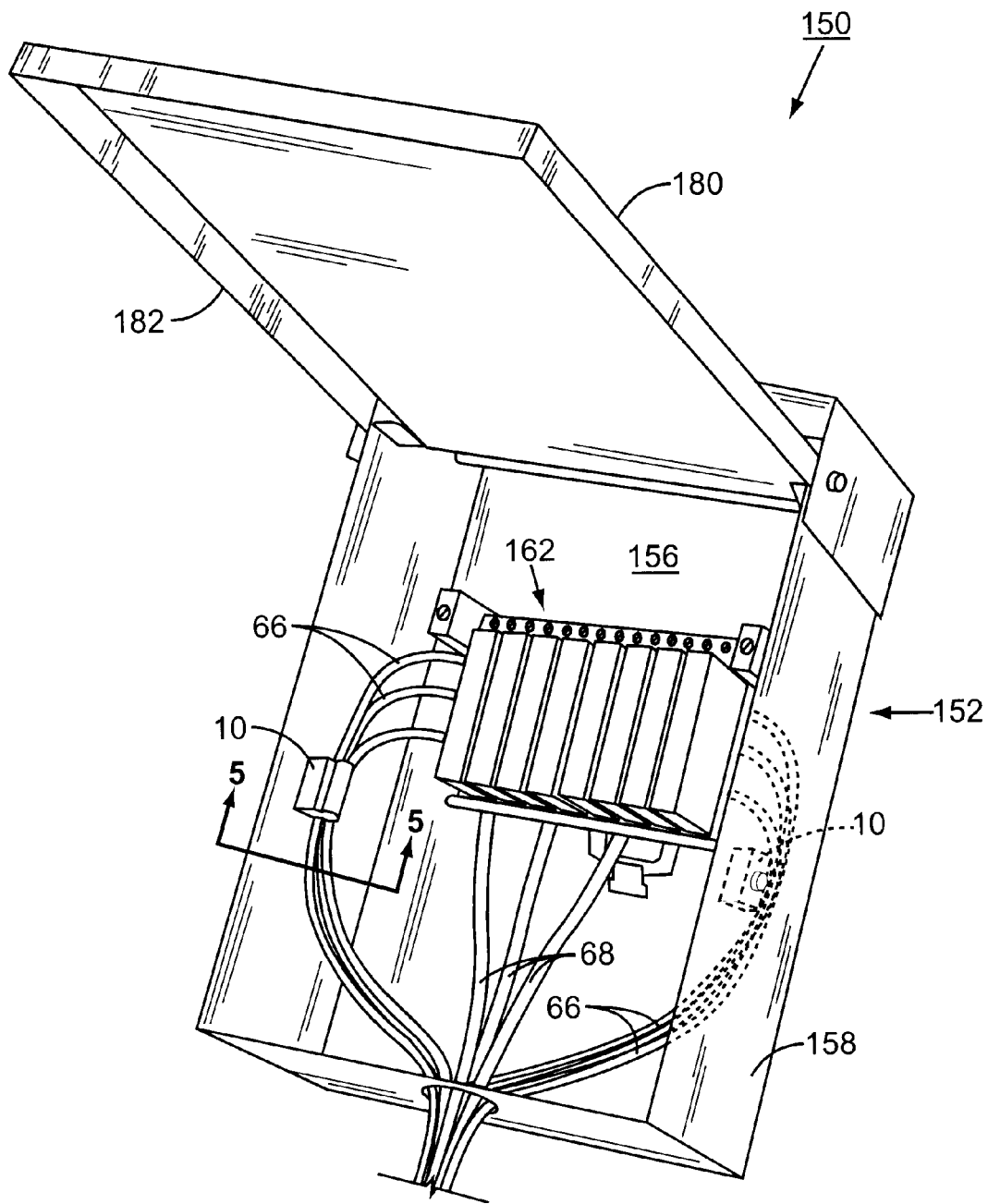
FIG. 4 illustrates a front perspective view of another fuse box for use in external environments with spacers positioned therein.
Figure 5:
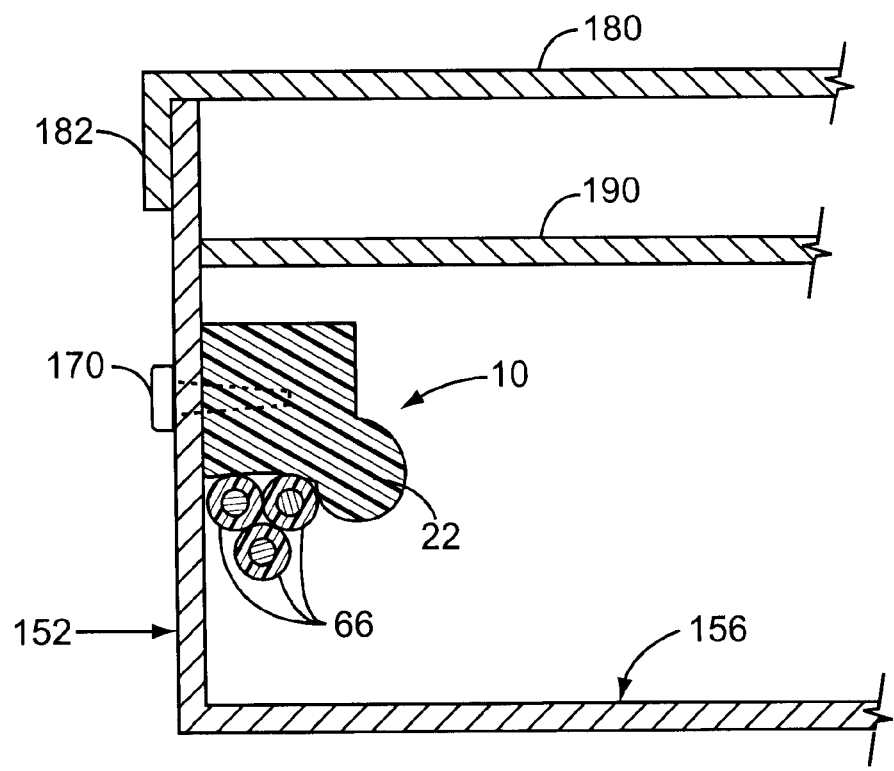
FIG. 5 illustrates a cross-sectional view of the fuse box of FIG. 4 along lines 5—5 with the faceplate closed.
Figure 6A:
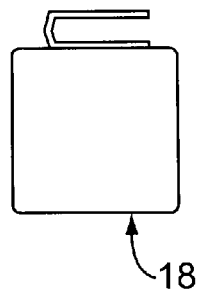
FIGS. 6A–6E illustrate side elevational views of alternate spacers.
Figure 6B:
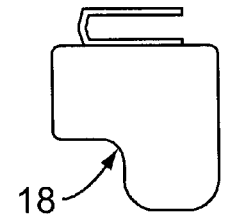
Figure 6C:
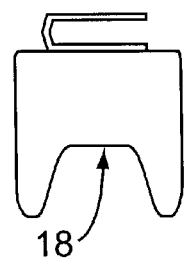
Figure 6D:
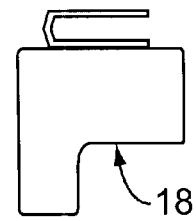
Figure 6E:
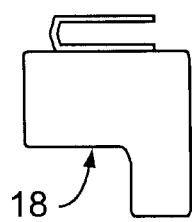

An alternate embodiment is illustrated in FIGS. 4 and 5. Fuse box 150 is similar to fuse box 50, with like parts being incremented by a factor of 100. However, fuse box 150 is designed for external use and thus has a moderately different layout so as to preclude environmental factors from damaging the electrical connections therewith. In particular, fuse box 150 comprises an external faceplate 180 having a lip 182 that curls around the exterior of the sidewalls 158 of the cabinet 152 (FIG. 5). Further, the fuse box 150 comprises a second, interiorly positioned faceplate 190 (FIG. 5). Interiorly positioned faceplates 190 are conventional in SQUARE-D's QO LOAD CENTER, CAT NO. Q08-16L100R8, SERIES G3. In such a fuse box 150, the spacer 10 may be positioned interiorly or beneath the interiorly positioned faceplate 190. Wires 66 and 68 may still be positioned underneath the spacer 10. In this embodiment, the spacer 10 may be attached to the sidewall 152 by a fastener 170. Thus, the wires do not push against the interiorly positioned faceplate 190.

Figure 7:
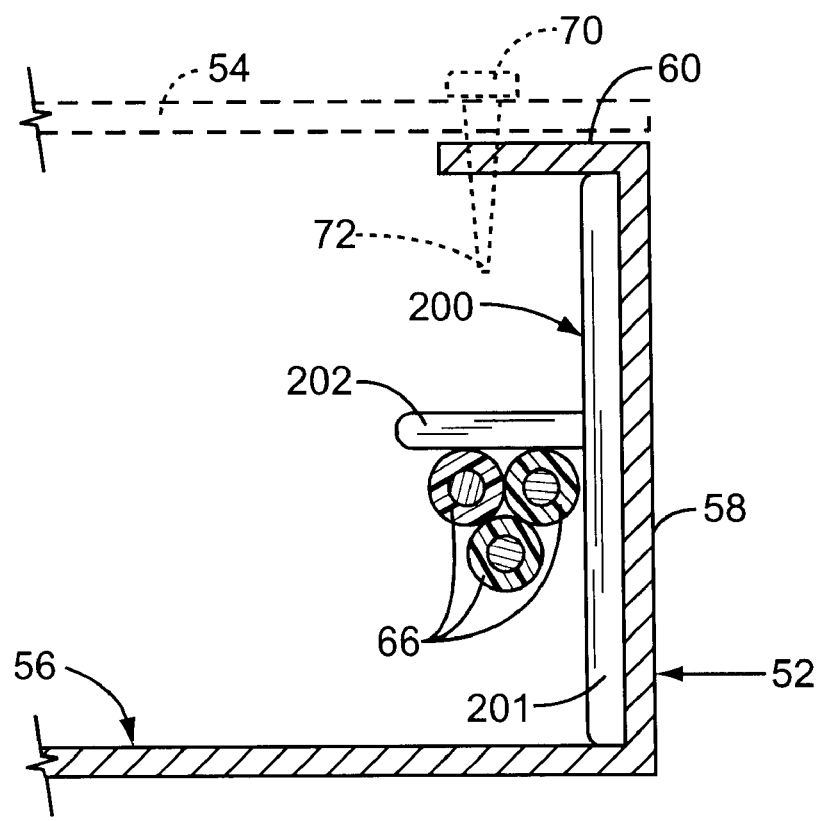
FIG. 7 illustrates a side elevational view of an alternate spacer positioned in a fuse box.
Figure 8:
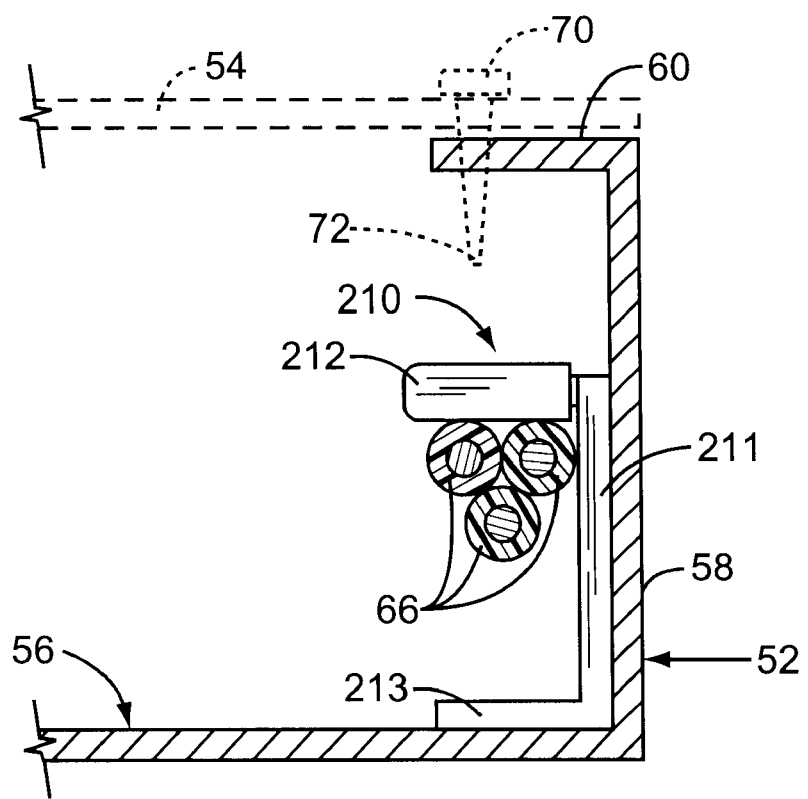
FIG. 8 illustrates a side elevational view of a permutation of the alternate spacer of FIG. 7 also positioned in a fuse box.

Two additional alternate embodiments are illustrated in FIGS. 7 and 8. In particular, FIG. 7 illustrates a spacer 200 having an inwardly projecting lip 202 that spaces wires 66 from the fastener 70. The spacer 200 may have a vertical member 201 that extends the height of the sidewall 58, however this is not required. Further, inwardly projecting lip 202 may be covered with a resilient non-conductive material such as rubber or the like to help prevent any edges on the spacer 200 from abrading the wires 66. Spacer 200 may be attached to the sidewall 58 or other surface in the fuse box 50 as needed or desired. This attaching may be done with an adhesive, by welding or by other technique.

FIG. 8 illustrates a similar spacer 210 having a vertical member 211, an inwardly projecting lip 212, and a base member 213. However, in this embodiment, inwardly projecting lip 212 maybe bent or folded over from the vertical. Note that inwardly projecting lips 202 and 212 need not be perpendicular to the respective vertical member of the spacers 202, 210 respectively if desired. Inwardly projecting member 212 may have a protective resilient non-conductive material placed thereover. Similarly to the spacer 200, spacer 212 may be attached to the fuse box 50 by a number of ways and in a number of locations.

Note further that the two embodiments of FIGS. 7 and 8 may be used with other fuse boxes beside fuse boxes 50 if needed or desired.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of protecting wires within a fuse box, comprising:
   securing a spacer contiguous to a sidewall underneath an inwardly curling lip in the fuse box, such that the spacer is disposed at a discrete location on said sidewall and enclosed within the interior of the fuse box; and
   positioning one or more wires contiguous the spacer such that fasteners used to close the fuse box are isolated from the wires.

2. The method of claim 1 wherein securing a spacer contiguous to a sidewall in a fuse box comprises securing the spacer with a fastener.

3. The method of claim 1 wherein securing a spacer contiguous to a sidewall in a fuse box comprises fastening the spacer to the sidewall.

4. The method of claim 1 wherein positioning one or more wires contiguous the spacer such that fasteners used to close the fuse box are isolated from the wires comprises positioning the one or more wires between a flange and the sidewall.

5. A spacer comprising:
   a body comprising first and second ends adjoining a fastening surface and a spacing surface, said fastening surface adapted to be secured to an interior surface of a fuse box, said spacing surface adapted to isolate wires from fasteners within the fuse box; and
   a clip secured to said fastening surface, said clip comprising an aperture through which said fasteners may be inserted.

6. The spacer of claim 5 wherein said spacing surface comprises a flange.

7. The spacer of claim 6 wherein said flange has an arcuate surface.

8. The spacer of claim 5 wherein said body is formed from a non-conductive material.

9. In combination, a fuse box and a spacer, said fuse box comprising:
   a fuse panel;
   a plurality of wires secured to said fuse panel and extending therefrom;
   a sidewall including an interior surface and an exterior surface;
   a faceplate selectively secured to said sidewall by one or more fasteners; and
   said spacer comprising:
      a body comprising a fastening surface and a spacing surface, said fastening surface adapted to be secured to said sidewall, said spacing surface adapted to isolate at least one of said plurality of wires from said one or more fasteners within the fuse box, said spacing surface spaced apart from said fastening surface by a distance greater than a length of said one or more fasteners; and
      said body disposed at a discrete location within said interior surface of said sidewall and enclosed within the interior of said fuse box.

10. The combination of claim 9 wherein said sidewall comprises an inwardly curling, lip and said spacer is secured to said inwardly curling lip by one of said one or more fasteners.

11. The combination of claim 9 wherein said fuse box further includes an interiorly positioned faceplate, said spacer positioned between said interiorly positioned faceplate and a back panel.

12. The combination of claim 11 wherein said spacer is attached to said sidewall by a fastener.

13. The combination of claim 9 wherein said one or more fasteners comprise one or more screws.

14. The combination of claim 9 wherein said spacing surface further comprises a flange, said at least one of said plurality of wires positioned between said flange and said sidewall.

15. The combination of claim 9 wherein said spacer further comprises an attachment device positioned on said fastening surface.

16. The combination of claim 9 wherein said spacer comprises a non-conductive material.

17. A spacer comprising:
   a vertical member having first and second ends secured to a fuse box wall; and
   an inwardly projecting member contiguous said vertical member and isolating wires from fasteners within the fuse box, said inwardly projecting member positioned between said first and second ends of said vertical member.

18. The spacer of claim 17 further comprising a base member attached to said vertical member.

19. The spacer of claim 17 further comprising a protective sheath over said inwardly projecting member.

20. The spacer of claim 19 wherein said inwardly projecting sheath comprises a rubber sheath.

21. The spacer of claim 17 wherein said vertical member is adapted to be placed contiguous a sidewall of said fusebox.

* * * * *